United States Patent Office

3,499,933
Patented Mar. 10, 1970

3,499,933
HYDROFORMYLATION OF CYCLIC OLEFINS
Roy L. Pruett, Charleston, W. Va., and Kenneth O. Groves, Midland, Mich., assignors to Union Carbide Corporation, a corporation of New York
No Drawing. Filed June 15, 1967, Ser. No. 646,183
Int. Cl. C07c *45/02, 47/38*
U.S. Cl. 260—598         11 Claims

ABSTRACT OF THE DISCLOSURE

Process involving the dihydroformylation of well-defined polycyclic non-conjugated diolefins which contain two alicyclic ethylenic bonds using a complex catalyst consisting essentially of rhodium in complex combination with carbon monoxide and a triarylphosphite ligand.

This invention relates to the preparation of oxygenated organic compounds by the reaction of an olefinic compound with carbon monoxide and hydrogen in the presence of certain complex catalysts and under carefully selected conditions described hereinafter. In one aspect, the invention relates to dihydroformylation of cyclic olefinic compounds to produce dialdehydic products.

Processes directed to the production of reaction mixtures comprising substantial amounts of aldehydes and at times lesser amounts of alcohols by the reaction of olefinic compounds with carbon monoxide and hydrogen at elevated temperatures and pressures in the presence of certain catalysts are well-known in the art. The aldehydes and alcohols produced generally correspond to the compounds obtained by the addition of a carbonyl or carbinol group to an olefinically unsatuurated carbon atom in the starting material with simultaneous saturation of the olefin bond. Isomerization of the olefin bond may take place to varying degrees under certain conditions with the consequent variation in the products obtained. Such processes are generally known in industry under varying names such as the Oxo process or reaction, oxonation, and/or hydroformylation. A disadvantage of such prior art hydroformylation processes is their dependance upon the use of catalysts such as cobalt octacarbonyl which require exceedingly high operative pressures and relatively high temperatures to maintain such catalysts in their stable form.

It has now been discovered quite unexpectedly, indeed, that a certain class of cyclic olefinic compounds, and in particular, polycyclic non-conjugated diolefinic compounds, can be conveniently reacted, in liquid phase, with carbon monoxide and hydrogen, at a moderately elevated temperature, in the presence of a rhodium-containing complex catalyst described hereinafter, to produce useful oxygenated products comprising aldehydes which have at least one (and preferably two) more carbon atom(s) than the cyclic olefinic reactant. In one embodiment, the practice of the novel process affords an excellent route to dihydroformylate polycyclic diolefins, preferably at a temperature not exceeding 95° C. when employing polycyclic diolefins which contain two strained-ring carbon-to-carbon ethylenic or olefinic bonds of approximately equal reactivity, to thus produce polycyclic dialdehydic products in high yields with a minimum of side products. The dialdehydic products are characterized in that they have two more carbon atoms (in the form of two formyl groups) than the diolefinic starting material.

The cyclic olefinic compounds which are contemplated in the novel process are characterized in that (1) they possess at least one alicyclic carbon-to-carbon ethylenic bond, i.e., a >C=C< group which forms part of a cycloaliphatic nucleus, (2) they possess a minimum of two ethylenic carbon-to-carbon bonds (including the alicyclic ethylenic unsaturation), (3) they possess from 1 to 6 cycloaliphatic nuclei having from 4 to 7 carbon atoms in each nucleus, and (4) they are free from acetylenic (—C≡C—), benzenoid (or aromatic), and conjugated ethylenic

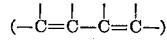

unsaturations. Highly desirable cyclic olefinic compounds are those which possess two ethylenic unsaturation sites and are composed solely of carbon and hydrogen atoms. The polycyclic diolefinic compounds which contain two alicyclic ethylenic bonds and from 2 to 5 cycloaliphatic nuclei are preferred. Those polycyclic diolefins which contain two strained-ring carbon-to-carbon ethylenic bonds of approximately equal reactivity are particularly preferred. Illustrative cyclic olefinic reactants include 4-vinylcyclohexene,
4-allylcyclohexene,
dicyclopentadiene,
bicyclo[2.2.1]hepta-2,5-diene,
tricyclo[6.2.1.0$^{2,7}$]undeca-4,9-diene,
tetracyclo[6.2.1.1$^{3,6}$.0$^{2,7}$]dodeca-4,9-diene,
pentacyclo[8.2.1.1$^{4,7}$.0$^{2,9}$.0$^{3,8}$]tetradeca-5,11-diene,
hexacyclo-[10.2.1.1$^{3,10}$.1$^{5,8}$.0$^{2,11}$.0$^{4,9}$]heptadeca-6,13,diene,
pentacyclo[6.6.1.1$^{3,6}$.0$^{2,7}$.0$^{9,14}$]hexadeca-2,11-diene,
methyltricyclo[5.2.1.0$^{2,6}$]deca-3,8-diene,
2-methylbicyclo[2.2.1]hepta-2,5-diene,
2-n-butylbicyclo[2.2.1]hepta-2,5-diene,
2-ethylbicyclo[2.2.1]hepta-2,5-diene,
2-isopropylbicyclo[2.2.1]hepta-2,5-diene,
4-ethyltricyclo[6.2.1.0$^{2,7}$]undec-4,9-diene,
3-methyltricyclo[6.2.1.0$^{2,7}$]undec-4,9-diene,
methyltetracyclo[6.2.1.1$^{3,6}$.0$^{2,7}$]dodeca-4,9-diene,
methylpentacyclo[6.6.1.1$^{3,6}$.0$^{2,7}$.0$^{9,14}$]hexadeca-2,11-diene, and the like.

As will become apparent from the operative examples contained herein, very unsatisfactory result and quite often little or no desired dialdehydic product was obtained when cycloocta-1,5-diene, cyclododeca-1,5,9-triene, crotonaldehyde, cyclopentadiene, and 1-methylene-2-vinylcyclopentane was contacted with the catalyst of choice, i.e., rhodium-carbonyltriphenyl phosphite complex, under the controlled operative conditions of the novel process.

The catalysts which are contemplated comprise rhodium in complex combination with carbon monoxide and a tertiary organo ligand containing a trivalent atom of a Group VA element, i.e., phosphorus, arsenic, and bismuth, wherein the trivalent atom has one available or unshared pair of electrons. In its active form, the suitable catalysts will contain the rhodium component in a reduced valence state. This will normally be a zero valence state and may suitably be even lower, such as a minus one (—1) valence state. The ligands are properly classified as phosphites, arsenites, or bismuthites.

As used throughout this specification and claims, the term "complex" means a coordination compound formed by the union of one or more electronically rich molecules or atoms capable of independent existence with one or more electronically poor molecules or atoms, each of which is also capable of independent existence.

Illustrative of the catalysts suitable for use in the novel process include rhodium in complex combination with carbon monoxide and a triarylphosphite, a triarylarsenite, or a triarylbismuthite such as triphenylphosphite, tri-p-tolylphosphite, tri - $\alpha$ - naphthylphosphite, tri-p-biphenylphosphite, tri-o-chlorophosphite, triphenylarsenite, tri-$\alpha$-naphthylarsenite, tri-p-tolylarsenite, triphenylbismuthite, tri-p-biphenylbismuthite, and the like. Of the illustrative catalysts those containing rhodium in complex combination with carbon monoxide and a triarylphosphite are preferred. From a standpoint of a combination of factors such as economics, availability, yields, etc., rhodium-carbonyltriphenylphosphite complex is the catalyst of choice.

It has been observed that mixed triorganophosphite ligands such as mixed aryl aryloxy and aryl alkoxy phosphorus compounds, e.g., $\phi_2P(O\phi)$, $\phi P(OCH_3)_2$, etc., when $\phi$ represents the phenyl radical, gave to varying degrees, quite unsatisfactory results.

The preferred triarylphosphite-rhodium-carbonyl complexes can be represented by the empirical formula:

$$[(RO)_3P]_aRh(CO)_b$$

wherein RO is an aryloxy radical, e.g., phenoxy; the alkylphnoxys such as methylphenoxy, ethylphenoxy, etc.; wherein $a$ and $b$ are integers each having a value of at least 1; and wherein the sum of $a$ plus $b$ represents 4. It is to be understood that the suitable catalysts identified by the above empirical formula may comprise two or more of the $[(RO)_3P]_aRh(CO)_b$ groups. For instance, in the suitable catalysts, the complex involving the rhodium, carbon monoxide, and a triarylphosphite ligand identified by said empirical formula may be monomeric or it may be composed of several monomeric units, e.g., dimer or trimer.

The novel hydroformylation is effected in the presence of a catalytically significant quantity of the complex catalyst. In general, a catalyst concentration in the range of from about 0.0001 and lower, to about 3, and higher, weight percent, calculated on the weight of rhodium metal to the weight of olefin feed employed is suitable. A catalyst concentration in the range of from about 0.001 to about 1.5 weight percent of rhodium metal (based on the weight of the olefin feed) is preferred. It is thus apparent that the concentration of the complex catalyst can vary over a fairly wide range.

The concentration of the ligand to rhodium metal, on the other hand, is somewhat critical. Though about one equivalent (and even less than one equivalent) of ligand per mole of rhodium gave operable results, a ratio of greater than about one and more desirably about 2 equivalents and still more desirably about 6 equivalents and upwards to about 30 equivalents, and higher, of ligand per mole of rhodium resulted in a high performance hydroformylation process, that is, high yields of aldehydic product as well as rapid reaction rates. Moreover, one can employ a potential or active catalyst source, whether preformed prior to introduction into the hydroformylation zone or prepared in situ during the hydroformylation reaction, and still obtain the benefit of the foregoing advantages. For instance, the concentration of the ligand was observed to have a definite influence on the hydroformylation of dicyclopentadiene. The non-distillable residues decreased dramatically when triphenylphosphite was added as a ligand to a reaction mixture of dicyclopentadiene and 0.5 weight percent rhodium on $Al_2O_3$ pellets. The resulting concentration was 2 equivalents of triphenylphosphite per mole of rhodium. This concentration is twice the amount necessary for the presumed intermediate $HRh(CO)_3[P(O\phi)_3]$. A threefold increase in said ligand, i.e., six equivalents of triphenylphosphite per mole of rhodium, resulted in a further decrease of the residues to less than half that previously obtained while the distilled dialdehydic product was increased from 68 percent to 88 percent of theory.

By reference to empirical formula supra, it is readily apparent that various rhodium complexes can be prepared depending upon the concentration of the ligand employed, that is, one, two, or three equivalents of ligand per mole of rhodium. The use of ligand in amounts greater than about 3 equivalents per mole of rhodium results in an admixture of highly active complex catalyst and ligand. Moreover, the novel hydroformylation process can be effected in the presence of a large excess of ligand, e.g., triphenylphosphite, which excess can be considered as an inert diluent in the reaction mixture. As a practical matter, however, the novel process is most effective when using a potential or active catalyst species which involves about 2 to about 10 equivalents of ligand per mole of rhodium. Of course, consideration must also be given to a correlation of factors such as operative temperature and pressure, the ratio of the components comprising the synthesis gas, etc., in order to attain optimum results.

Inherent advantages which also accrue by the practice of the novel process reside in the ability of the catalyst to remain stable and exhibit high activity for extended periods of time at relatively low pressures and low temperatures. Consequently, the novel proces can be carried out at pressures far below 20 atmospheres to as low as one atmosphere or less. Under comparable conditions, prior art catalysts such as cobalt octacarbonyl often decompose and become inactive. The invention, however, is not limited to such lower pressures and pressures from about atmospheric to about 300 atmospheres, and higher, are contemplated. However, optimization of the process generally requires superatmospheric pressures, that is, greater than about one atmosphere and upwards to about 250 atmospheres, and higher. Pressures of from about 10 atmospheres to about 200 atmospheres are preferred. The hydroformylation reaction is conducted at a moderately elevated temperature. In general, temperatures of from about 60° C. to 145° C. are suitable. A preferred temperature range is from about 65° C. to 130° C. A most preferred temperature range is from about 65° C. to 95° C. especially when the polycyclic diolefin reactant contains two strained-ring carbon-to-carbon ethylenic bonds of approximately equal reactivity, e.g., bicyclo-[2.2.1]hepta - 2,5 - diene, tetra[$6.2.1.1^{3,6}.0^{2,7}$]dodeca-4,9-diene, and the like.

The ratio of hydrogen to carbon monoxide employed in the hydroformylation reaction may vary over a wide range. Thus, the mole ratio of hydrogen to carbon monoxide can be less than one or greater than one, e.g., the ratio of hydrogen to carbon monoxide can be about 1:10 to about 10:1. Higher and lower ratios may also be employed. Desirable ratios of hydrogen to carbon monoxide are between about 1:3 to about 3:1.

As intimated previously, a significant variable which influences the residence period of the reaction and the yield of the aldehydic product is the concentration of the tertiary organo ligand, e.g., triarylphosphite, either in the complex catalyst per se or as an admixture of ligand and complex catalyst. Thus, depending on the concentration of ligand to rhodium as well as other variables such as reaction temperature, olefin of choice, catalyst of choice, etc., the residence period can vary from about a couple of minutes to several hours in duration. As a practical matter the reaction is effected for a period of time which is sufficient to hydroformylate an ethylenic bond in the olefinic reactant, and especially to dihydroformylate the polycyclic diolefins which possess strained-ring ethylenic bonds of approximately equal reactivity.

Solvents are not required in the practice of the novel process. If desired, however, one can employ normally-liquid organic solvents which are inert or which do not interfere to any substantial degree with the desired hydroformylation reaction under the operative conditions employed. Illustrative of such solvents include the saturated hydrocarbons, such as the pentanes, naphtha, kerosene, mineral oil, cyclohexane, etc. as well as the aromatic hydrocarbons, ethers, ketones, and nitriles as illustrated by benzene, xylene, toluene, diethyl ether, acetophenone, cyclohexanone, benzonitrile, and the like.

The preparation of the catalysts employed in the novel hydroformylation reaction is well-documented in the literature. A suitable method is to combine the rhodium salt of an organic acid with a selected ligand, e.g., triphenylphosphite, in liquid phase. The valence state of rhodium may then be reduced by hydrogenating the solution prior to the use of the catalysts therein. It may also be accomplished simultaneously with the hydroformylation process by means of increased carbon monoxide pressure preferably without the presence of hydrogen. Alternatively, the catalysts may be prepared from a carbon monoxide complex of rhodium. For example, it is possible to start with dirhodium octacarbonyl, and by heating this substance with a selected ligand, e.g., triphenylphosphite, the selected ligand will replace one or more of the carbon monoxide molecules, thus producing the desired catalyst. This latter method is very suitable for regulating the number of carbon monoxide molecules and other types of ligand molecules present in the catalyst. Thus, by increasing the amount of selected ligand added to the dirhodium octacarbonyl additional amounts of the carbon monoxide molecules can be replaced.

The following examples are illustrative.

EXAMPLE 1

A three-liter autoclave was charged with 108 grams (1.0 mole) of 4-vinylcyclohexene, 420 ml. of toluene, and 20 grams of 0.5 weight percent rhodium on $Al_2O_3$. The vessel was sealed, placed in a rocker and pressurized with 600 p.s.i.g. carbon monoxide and 1800 p.s.i.g. hydrogen. Rocking was begun and heat was applied. Reaction began in the range of about 80°–90° C. The temperature was controlled at 95°±2° C. for 15 minutes, 99°–100° C. for 1 hour, and 105° C. for 30 minutes. No reaction appeared to take place above 100° C. The vessel and contents were cooled to room temperature and the excess gases were vented. The contents were removed, filtered, and distilled at reduced pressure. The first fraction distilled at 55°–57° C. and 1.0 mm. of Hg pressure. The infrared spectra and nuclear magnetic resonance were consistent with a mixture of unsaturated monoaldehydic products identified as 3 - (3-cyclohexenyl)propanal (80 weight percent) and 2 - (3-cyclohexenyl)-2-methylethanal (20 weight percent). The second fraction distilled at 105°–108° C. and 1.3–1.6 mm. of Hg. The infrared spectra indicated a saturated dialdehyde. The yield of unsaturated monoaldehyde was 47 percent, that of dialdehyde 19 percent.

EXAMPLE 2

A three-liter autoclave was charged with 108 grams 4-vinylcyclohexene, 500 ml. of toluene, 20 grams of 0.5 weight percent rhodium on $Al_2O_3$ and 0.6 gram of triphenylphosphite. The vessel was sealed, placed in the rocker and pressurized with 800 p.s.i.g. of carbon monoxide and 1600 p.s.i.g. of hydrogen. Rocking was begun and heat was applied. At 70° C. a highly exothermic reaction was noticed, which was over in 12 minutes. The temperature was raised again. At about 110° C., a second reaction, slower than the first, began. Thirty minutes, at 110°–117° C., were required to complete this reaction. After cooling and venting, the vessel was opened. The contents were filtered and distilled. A 78% yield of dialdehydic products were obtained, which distilled at 78°–93° C. and 0.35–0.45 mm. of Hg pressure. The aldehydic products comprised a mixture of 2-(3-formylcyclohexyl)-1 - methylethanal, 2 - (4 - formylcyclohexyl) - 1 - methylethanal, 3-(3-formylcyclohexyl)propanal, and 3-(4-formylcyclohexyl)propanal.

EXAMPLE 3

A three-liter, nitrogen-purged autoclave was charged with 500 ml. of toluene, 150 grams of freshly distilled bicyclo[2.2.1]hepta-2,5-diene, 25 grams of 0.5 weight percent rhodium on $Al_2O_3$, and 0.8 gram of triphenylphosphite. The vessel was sealed, placed on the rocker platform and pressurized with 800 p.s.i.g. of carbon monoxide and 1600 p.s.i.g. of hydrogen. Rocking was begun and heat was applied. At 80° C. a strongly exothermic reaction occurred. The temperature was held in the range 80°–83° C. by air cooling. After 28 minutes the reaction was complete (gas absorption 1200 p.s.i.g.) and the vessel and contents were cooled to room temperature. After venting the vessel of excess gases, the contents were removed, filtered, and the filtrate was distilled. A 53% yield of dialdehyde was obtained, which distilled at 80°–90° C. at 0.5 mm. of Hg pressure. The aldehydic products comprised bicyclo[2.2.1]heptane-2,5-dicarboxaldehyde and bicyclo[2.2.1]heptane-2,6-dicarboxaldehyde.

EXAMPLE 4

The reaction conditions were identical to those in Example 3, except that the catalyst mixture was 20 grams of 0.5 weight percent rhodium on $Al_2O_3$ and 1.8 grams of triphenylphosphite (6 equivalents of triphenylphosphite per mole of rhodium). The yield of distilled dialdehydic products were 88% of theory.

EXAMPLE 5

A 3-liter nitrogen-purged autoclave was charged with 132 grams of dicyclopentadiene, 660 ml. of toluene, and 1.8 grams of $(CO)_6Co_2[P(OC_6H_5)_3]_2$. The vessel was sealed, placed on a platform rocker and charged with 600 p.s.i.g. of carbon monoxide and 1800 p.s.i.g. of hydrogen. Rocking was begun and heat was applied. At 85° C., a strong exotherm was noticed. The reaction took place in the temperature range 85°–105° C. over a period of 25 minutes. After cooling to room temperature, the excess gases were vented and the vessel opened. The contents were filtered to remove a small amount of dark solid, and the filtrate was then distilled. The efficiency to unsaturated monoaldehyde was 40%, to dialdehyde was 39%. The dialdehydic products were identified as tricyclo[$5.2.1.0^{2,6}$]decane-3(4)(5), 8-dicarboxaldehydes.

EXAMPLES 6–21

In Examples 6–21, a three-liter rocking autoclave was used as the reaction vessel. In all examples, toluene was employed as the solvent. Unless indicated otherwise, the rhodium species was generally employed as 0.5 weight percent Rh on alumina or 5 weight percent Rh on carbon. After charging to the autoclave toluene, dienic reactant, rhodium source, ligand if any, and activated carbon if any, the autoclave was sealed and pressurized with carbon monoxide and hydrogen. The autoclave then was heated with rocking until reaction began, as evidenced by pressure drop and heat being evolved. The temperature was controlled at the lowest point consistent with a good rate of reaction. After cooling to room temperature, i.e., 20° to 22° C., the excess gases were vented and the autoclave opened. The contents were filtered to remove the catalyst and the liquid phase was distilled. The pertinent data are set out in Table I.

TABLE I

| Example | Diene | Grams | Grams of toluene | Rh source | Ligand | Grams | H₂ Pressure | CO pressure | Reaction temp., °C. | Time,[1] min. | Grams of distillate | Grams of residue | Yield,[2] percent | Remarks |
|---|---|---|---|---|---|---|---|---|---|---|---|---|---|---|
| 6 | BHC Dimer[3] | 184 | 433 | 0.5% Rh/Al₂O₃ | (φO)₃P | 10 | 0.6 | 1,800 | 600 | 83-90 | 9 | 111.4 | | 84 | |
| 7 | Dicyclo[4] | 100 | 343 | 0.5% Rh/Al₂O₃ | (φO)₃P | 20 | 0.62 | 1,700 | 700 | 80 | 4 | 114 | 8 | 87 | |
| 8 | (5) | 108 | 433 | 0.5% Rh/Al₂O₃ | (φO)₃P | 20 | 0.6 | 1,600 | 800 | 105-107 | 23 | 131 | | 78 | |
| | | | | | | | | | | 72-77 | 9 | | | | |
| 9 | CDT[6] | 108 | 343 | 0.5% Rh/Al₂O₃ | (φO)₃P | 20 | 0.6 | 1,800 | 600 | 110-117 | 14 | | | | No reaction. |
| 10 | BCH[7] | 88 | 343 | 0.5% Rh/Al₂O₃ | (φO)₃P | 20 | 0.6 | 1,700 | 700 | →120 | a 30 | 112 | 22.5 | 68 | |
| 11 | Cyclo[8] | 48 | 517 | 0.5% Rh/Al₂O₃ | (φO)₃P | 20 | 0.6 | 2,100 | 700 | →120 | a 10 | | | | Do. |
| 12 | COD[9] | 108 | 343 | 0.5% Rh/Al₂O₃ | (φO)₃P | 20 | 0.6 | 1,700 | 800 | →120 | a 15 | (b) | 46.5 | | Distilled over wide range. |
| 13 | BCH[7] | 100 | 433 | 0.5% Rh/Al₂O₃ | (φO)₃P | 20 | 1.8 | 1,600 | 800 | →110 | a 30 | 142 | 12.5 | 88 | |
| 14 | BCH[7] | 100 | 433 | 5% Rh/Carbon | (φO)₃P | 20 | 1.8 | 1,600 | 800 | 70-78 | 18 | 148 | 9.5 | 88 | |
| 15 | BCH[7] | 100 | 433 | do | (φO)₃P | 2 | 1.8 | 1,600 | 800 | 72-78 | 16 | 140 | 7 | 86 | |
| 16 | Crot[10] | 100 | 433 | 5% Rh/C plus 20 grams of C | (φO)₃P | 2 | 1.8 | 1,600 | 800 | →130 | a 15 | | | | No reaction. |
| 17 | MVCP[11] | 35 | 433 | 5% Rh/C plus 20 grams of C | (φO)₃P | 2 | 1.8 | 1,600 | 800 | →120 | a >60 | | | | Long slow experiment. |
| 18 | BCH[7] | 88 | 433 | do | (φO)₃P | 20 | 3.6 | 1,600 | 800 | 75-100 | a 7 | 142 | 8.5 | 87 | Small amount gas uptake; polymeric product. |
| 19 | BCH[7] | 100 | 433 | 0.5% Rh/Al₂O₃ | φ₂P(Oφ) | 20 | 1.6 | 1,600 | 800 | →110 | a 10 | | | | No reaction except some polymer. |
| 20 | BCH[7] | 100 | 433 | 0.5% Rh/Al₂O₃ | φP(OCH₃)₂ | 20 | 1.0 | 1,600 | 800 | 80-82 | 75 | 89 | 62.5 | 54 | Slow reaction. |
| 21 | BCH[7] | 100 | 433 | RhCl₃·3H₂O | None | 0.2 | 0 | 1,600 | 800 | →151 | 15 | | | | |

[1] Time for 80% reaction.
[2] Yield of dialdehydic products.
[3] Pentacyclo [8.2.1.1⁴,⁷.0²,⁹.0³,⁸] tetradeca-5, 11-diene.
[4] Dicyclopentadiene.
[5] 4-vinylcyclohexene.
[6] Cyclodeca-1, 5, 9-triene.
[7] Bicyclo [2.2.1] hepta-2, 5-diene.
[8] Cyclopentadiene.
[9] Cycloocta-1, 5-diene.
[10] Crotonaldehyde.
[11] 1-methylene-2-vinylcyclopentane.

ᵃ Temperature was increased usually by increments of about 10°C., then held at the increased temperature for approximately 5-10 minutes. Final temperature is indicated by arrow.
ᵇ Distillation of reaction products (139 grams) gave:

| Temp, °C. | P mm. Hg | Distillate; grams |
|---|---|---|
| 28-47 | 0.35-0.75 | 10 |
| 47-51 | 0.35-0.40 | 34 |
| 51-78 | 0.40-0.50 | 23.5 |
| 78-105 | 0.50-1.0 | 15 |
| Residue | | 48.5 |

What is claimed is:
1. A process which comprises contacting (1) polycyclic diolefins of the group consisting of dicyclopentadiene, bicyclo[2.2.1]-hepta-2,5-diene, tricyclo[6.2.1.0$^{2,7}$]undeca-4,9-diene, tetracyclo[6.2.1.1$^{3,6}$.0$^{2,7}$]dodeca-4,9-diene, pentacyclo[8.2.1.1$^{4,7}$.0$^{2,9}$.0$^{3,8}$]tetradeca - 5,11-diene, hexacyclo-[10.2.1.1$^{3,10}$.1$^{5,8}$.0$^{2,11}$.0$^{4,9}$]heptadeca-6,13 - diene, pentacyclo[6.6.1.1$^{3,6}$.0$^{2,7}$.0$^{9,14}$]hexadeca-2,11-diene, methyltricyclo[5.2.1.0$^{2,6}$]deca-3,8 - diene, 2-methylbicyclo[2.2.1]hepta-2,5-diene, 2-n-butylbicyclo[2.2.1]hepta-2,5 - diene, 2-ethylbicyclo[2.2.1]hepta - 2,5 - diene, 2 - isopropylbicyclo[2.2.1]hepta-2,5-diene, 4-ethyltricyclo[6.2.1.0$^{2,7}$]undec-4,9 - diene, 3 - methyltricyclo[6.2.1.0$^{2,7}$]undec - 4,9 - diene, methyltetracyclo[6.2.1.1$^{3,6}$.0$^{2,7}$]dodeca - 4,9 - diene, and methylpentacyclo[6.6.1.1$^{3,6}$.0$^{2,7}$.0$^{9,14}$]hexadeca - 2,11 - diene; (2) carbon monoxide; (3) hydrogen; (4) a catalytic quantity of a complex catalyst consisting essentially of rhodium in complex combination with carbon monoxide and a triarylphosphite, the concentration of said triarylphosphite being at least two equivalents per mole of rhodium; and (5) excess triarylphosphite; (6) at a temperature in the range of from about 65° C. to 130° C.; (7) at a pressure greater than about one atmosphere; and (8) for a period of time sufficient to dihydroformylate said polycyclic diolefinic reactants thereby producing polycyclic dialdehydic products which have two more carbon atoms than the diolefinic reactant.
2. The process of claim 1 wherein there is employed from about 2 to about 30 equivalents of triarylphosphite per mole of rhodium.
3. The process of claim 2 wherein the pressure is from about 10 atmospheres to about 200 atmospheres.
4. The process of claim 3 wherein said triarylphosphite is triphenylphosphite, and wherein the temperature is in the range of from about 65° C. to 95° C.
5. The process of claim 4 wherein there is employed from about 2 to about 10 equivalents of triphenylphosphite per mole of rhodium.
6. The process of claim 4 wherein said polycyclic diolefin is bicyclo[2.2.1]hepta-2,5-diene.
7. The process of claim 4 wherein said polycyclic didiolefin is pentacyclo[8.2.1.1$^{4,7}$.0$^{2,9}$.0$^{3,8}$]tetradeca - 5,11-diene.
8. The process of claim 1 wherein said complex catalyst has the empirical formula:

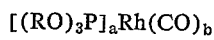

wherein RO is aryloxy; wherein $a$ and $b$ are integers each having a value of at least one; and wherein the sum of $a$ plus $b$ represents 4.
9. A process which comprises contacting (1) polycyclic diolefins of the group consisting of dicyclopentadiene, bicyclo[2.2.1]hepta - 2,5-diene, tricyclo[6.2.1.0$^{2,7}$]undeca-4,9-diene, tetracyclo[6.2.1.1$^{3,6}$.0$^{2,7}$]dodeca-4,9-diene, pentacyclo[8.2.1.1$^{4,7}$.0$^{2,9}$.0$^{3,8}$]tetradeca - 5,11 - diene, hexacyclo-[10.2.1.1$^{3,10}$.1$^{5,8}$.0$^{2,11}$.0$^{4,9}$]heptadeca - 6,13-diene, pentacyclo[6.6.1.1$^{3,6}$.0$^{2,7}$.0$^{9,14}$]hexadeca-2.11-diene, methyltricyclo[5.2.1.0$^{2,6}$]deca-3,8-diene, 2-methylbicyclo[2.2.1]hepta-2,5-diene, 2-n-butylbicyclo[2.2.1]hepta-2,5 - diene, 2-ethylbicyclo[2.2.1]hepta-2,5 - diene, 2-isopropylbicyclo[2.2.1]hepta-2,5-diene, 4-ethyltricyclo[6.2.1.0$^{2,7}$]undec-4,9-diene, 3-methyltricyclo[6.2.1.0$^{2,7}$]undec-4,9 - diene, methyltetracyclo[6.2.1.1$^{3,6}$.0$^{2,7}$]dodeca-4,9-diene, and methylpentacyclo[6.6.1.1$^{3,6}$.0$^{2,7}$.0$^{9,14}$]hexadeca-2,11-diene; (2) carbon monoxide; (3) hydrogen; (4) a catalytic quantity of a complexed catalyst consisting essentially of rhodium in complex combination with carbon monoxide and triarylphosphite, the concentration of said triarylphosphite being at least two equivalents per mole of rhodium; (5) excess triarylphosphite; (6) at a temperature in the range from about 60° C. to 145° C.; (7) at a pressure greater than about 1 atmosphere; and (8) for a period of time sufficient to produce cyclic dialdehydic products which have two more carbon atoms than the cyclic olefinic reactant.
10. The process of claim 9 wherein said triarylphosphite is triphenylphosphite.
11. The process of claim 9 wherein said cyclic olefinic compounds are polycyclic diolefins which contain two alicyclic strained-ring carbon-to-carbon ethylenic bonds of approximately equal reactivity.

References Cited
UNITED STATES PATENTS

| | | |
|---|---|---|
| 3,102,899 | 9/1963 | Cannell. |
| 3,168,553 | 2/1965 | Slaugh. |
| 3,239,566 | 3/1966 | Slaugh et al. |

BERNARD HELFIN, Primary Examiner

U.S. Cl. X.R.

252—428, 429